May 2, 1933. S. M. TAYLOR 1,906,660
SAW BLADE
Filed Dec. 31, 1930
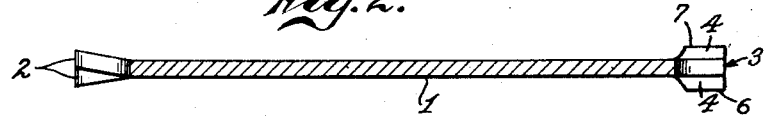
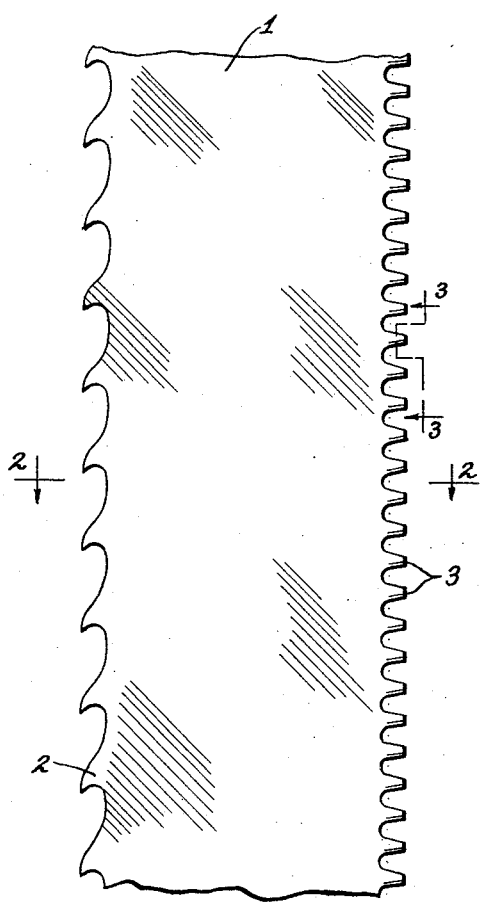
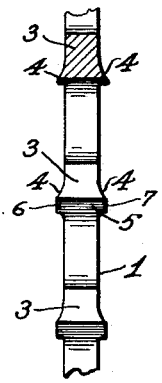
Inventor
Samuel M. Taylor;
By Lyon & Lyon
Attorneys Patented May 2, 1933

1,906,660

UNITED STATES PATENT OFFICE

SAMUEL M. TAYLOR, OF LOYALTON, CALIFORNIA, ASSIGNOR TO SMOOTH SAW EQUIPMENT COMPANY, OF LOYALTON, CALIFORNIA, A CORPORATION OF NEVADA.

SAW BLADE

Application filed December 31, 1930. Serial No. 505,745.

This invention relates to saw-blades that will not only act as an ordinary saw but will at the same time smooth the rough surfaces of the cut and remove the sawdust which may cling to the sides of the material being sawed.

It is the principal object of this invention to provide a saw blade which will act as an ordinary saw and to smooth the rough surfaces of the cut and remove the sawdust therefrom.

It is a further object of this invention to provide a saw blade with a plurality of planing teeth arranged whereby each planing tooth has a relatively flat planing surface at substantially right angles to the plane of the cut and each planing surface terminating at each side in parallel cutting edges arranged to engage opposite sides of the cut.

Further objects and advantages will appear in the specifications and drawing.

A preferred embodiment of the invention is described in the following specifications and illustrated in the drawing, while the full scope of the invention is pointed out in the appended claims.

In the drawing:

Figure 1 is a side view of a portion of the saw blade.

Figure 2 is an enlarged sectional view of the saw taken substantially along the line 2—2 of Figure 1, and looking in the direction of the arrows.

Figure 3 is an enlarged part sectional and part end view of the planing and sawdust removing teeth taken substantially along the line 3—3 of Figure 1 and looking in the direction of the arrows.

In the preferred embodiment of the invention, as illustrated in the drawing, a saw blade 1, which may be of the band type, is provided upon its front edge with cutting teeth 2 of the standard and well known type, and upon its rear edge with planing and dust removing teeth 3. From experience it has been found preferable that each planing tooth 3 engage each side of the cut made by the cutting teeth 2 to prevent chattering of the blade and to insure the removal of the sawdust.

Each of the planing teeth 3 are therefore swedged as at 4—4 as most clearly illustrated in Figures 2 and 3 to widen the cutting edge of each tooth to a slightly greater width than the cut made by the cutting teeth 2. By thus swedging each of the planing teeth 3 a relatively flat planing surface 5 is formed which extends across the cut in a plane substantially perpendicular thereto and by grinding the surface 5 sharp cutting edges 6 and 7 are formed at each side of the planing surface 5. It will be noted by referring to the drawing that each planing tooth 3 is swedged for substantially its full depth and consequently, the cutting edges 6 and 7 likewise extend substantially the full depth of each tooth. The cutting edges 6 and 7 are preferably straight and parallel but may be of any desired shape or angle.

In operation, the saw blade 1 is preferably of the well-known band saw type and rotated at a relatively high rate of speed. Material to be sawed is presented to the cutting teeth 2 which are mounted upon the forward edge of the blade 1. As the material is moved past the saw the cutting teeth 2 cut a kerf, slightly wider than the thickness of blade 1. When the kerf or cut in the material being sawed reaches the planing and sawdust removing teeth 3, the cutting edges 6 and 7 of teeth 3 engage the sides of the kerf or cut to surface or smooth the material and also scrape and carry through the material any sawdust that may be clinging to the surface thereof. When the planing teeth become dulled they may be sharpened by re-grinding the flat face 5 thereof.

By arranging each tooth of planing teeth 3 so that it engages both sides of the cut, the teeth are guided and thus prevent chattering of the teeth and blade, and by arranging the cutting edges of each tooth of the planing teeth 3 to engage the sides of the cut in a plane substantially at right angles to the plane of the cut, the cutting edges do not have the tendency to dig in or to be forced out of the wood due to the teeth meeting hard and soft sections in the wood and this also has its effect upon eliminating chattering of the teeth and blade.

No claim is made for saws having teeth upon opposite edges because such saws have long been in use; but a saw blade having planing teeth, each tooth of which engages both sides of the cut and having cutting edges at substantially right angles thereto is believed new.

It is understood that the embodiment of the invention described herein is only one of the many embodiments this invention may take, and I do not wish to be limited in the practice of the invention, nor in the claims, to the particular embodiment set forth.

I claim:

1. A saw blade provided with a plurality of planing teeth formed along the edge of the saw blade opposite the cutting edge, and each planing tooth arranged to engage both sides of the cut made by said saw blade.

2. A saw blade provided with a plurality of planing teeth formed along the edge of the saw blade opposite to the cutting edge, and each planing tooth having parallel planing surfaces arranged to actively engage opposite sides of the cut made by said saw.

3. A saw blade provided with a plurality of planing teeth formed along the edge of the saw blade opposite to the cutting edge, and each planing tooth having parallel planing surfaces in a plane substantially at right angles to the plane of the cut made by said saw, and arranged to actively engage opposite sides of said cut.

4. A saw blade provided with a plurality of planing teeth formed integrally along the edge of the saw blade opposite to the cutting edge and said planing teeth having oppositely disposed laterally extending planing surfaces arranged to actively engage opposite sides of the cut made by said saw blade.

Signed at Loyalton, California, this 23rd day of December, 1930.

SAMUEL M. TAYLOR.